US008007918B2

(12) United States Patent
Godfrey

(10) Patent No.: US 8,007,918 B2
(45) Date of Patent: Aug. 30, 2011

(54) PLASTICIZERS FOR IMPROVED ELEVATED TEMPERATURE PROPERTIES IN CELLULOSE ESTERS

(75) Inventor: Darryl Aubrey Godfrey, Gray, TN (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 12/198,996

(22) Filed: Aug. 27, 2008

(65) Prior Publication Data

US 2009/0057610 A1 Mar. 5, 2009

Related U.S. Application Data

(60) Provisional application No. 60/966,324, filed on Aug. 27, 2007.

(51) Int. Cl.
*B32B 9/04* (2006.01)
*C08L 91/00* (2006.01)

(52) U.S. Cl. ......................... 428/498; 524/313; 524/314

(58) Field of Classification Search .................. 524/313, 524/314; 428/498
See application file for complete search history.

(56) References Cited

U.S. PATENT DOCUMENTS 3,642,346 A * 2/1972 Dittmar ......................... 359/463

FOREIGN PATENT DOCUMENTS

JP 2001122980 A 5/2001
JP 2001163995 A 6/2001

OTHER PUBLICATIONS

ASTM International, Standard Test Method for Viscosity of Cellulose Derivatives by Ball-Drop Method, Designation D1343-95, (Reapproved 2006), pp. 224-227.

Research Disclosure 15821, Cellulosic compositions that will not stick to processing equipment at high temperatures (anonymous).

Seymour and Minter, Analysis of Plasticizer Activity in Cellulose Ēster, Polymer Engineering and Science, Dec. 1980, vol. 20, No. 18, pp. 1188-1191.

* cited by examiner

*Primary Examiner* — David Wu
*Assistant Examiner* — Sonya Wright
(74) *Attorney, Agent, or Firm* — Louis N Moreno; Bernard J. Graves, Jr.

(57) ABSTRACT

In one aspect, the invention relates to a composition comprising a cellulose ester and a high boiling plasticizer having a boiling point greater than 370° C., wherein the composition has a glass transition temperature (Tg) greater than a similar composition having triphenyl phosphate (TPP) plasticizer substituted for the high boiling plasticizer. The invention also related to articles and films made therefrom. This invention also relates to methods of making the compositions, articles and films.

24 Claims, No Drawings

PLASTICIZERS FOR IMPROVED ELEVATED TEMPERATURE PROPERTIES IN CELLULOSE ESTERS

RELATED APPLICATION

This claims benefit of provisional application having U.S. Ser. No. 60/966,324, filed Aug. 27, 2007, the entire disclosure of which incorporated herein by reference.

BACKGROUND OF THE INVENTION

1. Field of the Invention

This invention relates to plasticizers for liquid crystal display (LCD) films. More particularly, this invention relates to compositions comprising plasticizers that improve the elevated temperature properties of cellulose esters and films made from the cellulose ester compositions.

2. Background of the Invention

Triphenyl phosphate (TPP) is the primary plasticizer used in many liquid crystal display (LCD) films. A plasticizer system is needed to retain a sufficient glass transition temperature (Tg) for the film without making the film too stiff. Trioctyl trimellitate (TOTM) and diundecyl phthalate (DUP) are high boiling plasticizers mainly used in polyvinyl chloride (PVC). Plasticizers typically reduce Tg for films as the flexibility of the film is increased.

BRIEF SUMMARY OF THE INVENTION

In one aspect, the invention relates to a composition comprising a cellulose ester and a high boiling plasticizer having a boiling point greater than 370° C., wherein the composition has a glass transition temperature (Tg) greater than a similar composition having triphenyl phosphate (TPP) plasticizer substituted for the high boiling plasticizer.

In one aspect, the invention relates to a composition comprising a cellulose ester and a high boiling plasticizer having a boiling point greater than 370° C., wherein the composition has a glass transition temperature (Tg) greater than a similar composition having only triphenyl phosphate plasticizer.

In another aspect, the invention relates to a method of improving thermal properties of a film, the method comprising blending a cellulose ester with a high boiling plasticizer to form a plasticized cellulose ester; and optionally blending a lower boiling plasticizer with the plasticized cellulose ester, wherein the high boiling plasticizer is in an amount sufficient to raise the Tg of the plasticized cellulose ester by at least about 10° C. in comparison a similar composition having triphenyl phosphate substituted for the high boiling plasticizer.

In another aspect, the invention relates to a method of improving thermal properties of a film, the method comprising blending a cellulose ester with a high boiling plasticizer to form a plasticized cellulose ester; and optionally blending a lower boiling plasticizer with the plasticized cellulose ester, wherein the high boiling plasticizer is in an amount sufficient to raise the Tg of the plasticized cellulose ester by at least about 10° C. in comparison a similar composition having only triphenyl phosphate as the plasticizer.

In one aspect, the invention relates to an article comprising a cellulose ester and a high boiling plasticizer having a boiling point greater than 370° C., wherein the article has a Tg greater than a similar article having triphenyl phosphate plasticizer substituted for the high boiling plasticizer.

In one aspect, the invention relates to an article comprising a cellulose ester and a high boiling plasticizer having a boiling point greater than 370° C., wherein the article has a Tg greater than a similar article having only triphenyl phosphate as the plasticizer.

In one aspect, the invention relates to a film comprising a cellulose ester and a high boiling plasticizer having a boiling point greater than 370° C., wherein the film has a Tg greater than a similar film having only triphenyl phosphate as the plasticizer.

In one aspect, the invention relates to a composition comprising a cellulose ester, a first plasticizer having a boiling point below 370° C. and a second plasticizer having a boiling point greater than 370° C., wherein the composition has a Tg greater than a Tg of a blend of the cellulose ester and the first plasticizer.

In one aspect, the invention relates to a composition comprising a cellulose ester, a first plasticizer having a boiling point below 370° C. and a second plasticizer having a boiling point greater than 370° C., wherein the composition has a Tg greater than a Tg of a blend of the cellulose ester and only triphenyl phosphate as the plasticizer.

In one aspect, the invention relates to a method of making a film, the method comprising blending a high boiling plasticizer into a cellulose ester to form a blend composition; and solvent casting the blend composition to form a film, wherein the film has an increased Tg and a decreased break stress compared to a similar film made using the same total weight percent of a low boiling plasticizer.

In one aspect, the invention relates to a method of making a film, the method comprising blending a high boiling plasticizer into a cellulose ester to form a blend composition; and solvent casting the blend composition to form a film, wherein the film has an increased Tg and a decreased break stress compared to a similar film made using the same total weight percent of only triphenyl phosphate as a plasticizer.

In one aspect, the invention relates to a method of making a film with increased Tg and decreased yield stress in a cellulose ester film, the method comprising blending a high boiling plasticizer into a cellulose ester to form a blend composition; and solvent casting the blend composition to form a film, wherein the film has an increased Tg and a decreased yield stress compared to a similar film made using the same total weight percent of a low boiling plasticizer.

In one aspect the invention relates to a method of making a film with increased Tg and decreased yield stress in the film, the method comprising blending a high boiling plasticizer into a cellulose ester to form a blend composition; and solvent casting the blend composition to form the film, wherein the film has an increased Tg and a decreased yield stress compared to a similar film made using the same total weight percent of only triphenyl phosphine as the plasticizer.

DETAILED DESCRIPTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

It has been discovered that certain high boiling plasticizers used in addition to or in substitution for low boiling plasticizers in cellulose esters results in increasing the Tg of a composition comprising a cellulose ester and the high boiling plasticizer relative to the Tg of a similar cellulose ester and low boiling plasticizer. It has been discovered that certain high boiling plasticizers used in addition to or in substitution for low boiling plasticizers in cellulose esters results in improved dimensional stability of a composition comprising a cellulose ester and the high boiling plasticizer relative to the dimensional stability of a similar cellulose ester and low boiling plasticizer.

Unless otherwise indicated, all numbers expressing quantities of ingredients, properties such as molecular weight, reaction conditions, and so forth used in the specification and claims are to be understood as being modified in all instances by the term “about.” Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, “$C_1$ to $C_5$ hydrocarbons”, is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

As used in the specification and the appended claims, the singular forms “a,” “an” and “the” include their plural referents unless the context clearly dictates otherwise. For example, reference a “plasticizer,” or a “cellulose ester,” is intended to include a plurality of plasticizers or cellulose esters. References to a composition containing or including “an” plasticizer or “a” cellulose ester is intended to include other plasticizers or other cellulose esters, respectively, in addition to the one named.

By “comprising” or “containing” or “including” we mean that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as that which is named, unless expressly excluded in the claims.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence, unless otherwise indicated.

Suitable cellulose esters include, but are not limited to, cellulose acetate, cellulose acetate butyrate, cellulose acetate propionates and mixtures thereof.

In certain embodiments, suitable cellulose acetates of utility in this invention typically have a degree of substitution from 2.4 to 3.0. In other embodiments, other useful cellulose esters include cellulose acylates which are esters of cellulose and one or more carboxylic acids (also referred to as fatty acids) each having 2 or more carbons. Certain preferred embodiments utilize fatty acids having 2 carbons (acetic acid), 3 carbons (propionic acid), and 4 carbons (butyric acid). The source of the cellulose is not critical and may be derived from, for example, wood or cotton. The cellulose acylates may have a degree of acetyl substitution from 0 to 2.5, a degree of propionyl substitution ranging from 0.5 to 2.7, a degree of butyryl substitution ranging from 0.5 to 2.7, and a total degree of substitution ranging from 2.0 to 3.0.

In another embodiment, deterioration inhibitors including, but not limited to, peroxide decomposers, radical inhibitors, metal inactivating agents, or oxygen scavengers or ultraviolet inhibitors can also be incorporated into the cellulose ester compositions and films made therefrom.

In certain embodiments of the present invention, suitable cellulose acetates have a degree of substitution of acetate ranging from 2.4 to 3.0, or 2.6 to 2.9, or 2.7 to 2.9, and an ASTM D 1343 viscosity of 30 to 150 seconds.

In other embodiments of the present invention, suitable cellulose acetate butyrates have a degree of substitution of acetate ranging from 0.1 to 2.2, a degree of substitution of butyrate ranging from 0.5 to 2.8, and a total degree of substitution ranging from 2.0 to 2.9.

In certain embodiments of the present invention, suitable cellulose acetate propionates have a degree of substitution of acetate ranging from 0.03 to 2.2, a degree of substitution of propionate ranging from 0.4 to 2.6, and a total degree of substitution ranging from 2.0 to 2.8.

Suitable plasticizers include plasticizers having high boiling points, typically above about 370° C. In one embodiment, the boiling point of the high boiling plasticizer is typically at least about 370° C., 380° C., 390° C., 400° C., 410° C., 420° C., 430° C., 440° C., 450° C., 460° C., 470° C., 480° C., 490° C., or 500° C. In other embodiments, the boiling point of the high boiling plasticizer ranges from 400° C. to 500° C.; 400° C. to 490° C.; 400° C. to 480° C.; 400° C. to 470° C.; 400° C. to 460° C.; 400° C. to 450° C.; 400° C. to 440° C.; 400° C. to 430° C.; 400° C. to 420° C.; 400° C. to 410° C.; 410° C. to 500° C.; 410 to 490; 410 to 480; 410 to 470; 410 to 460; 410 to 450; 410 to 440; 410 to 430° C.; 410° C. to 420° C.; 420° C. to 500° C.; 420° C. to 490° C.; 420° C. to 480° C.; 420° C. to 470° C.; 420° C. to 460° C.; 420° C. to 450° C.; 420° C. to 440° C.; 420° C. to 430° C.; 430° C. to 500° C.; 430° C. to 490° C.; 430° C. to 480° C.; 430° C. to 470° C.; 430° C. to 460° C.; 430° C. to 450° C.; 430° C. to 440° C.; 440° C. to 500° C.; 440° C. to 490° C.; 440° C. to 480° C.; 430° C. to 470° C.; 430° C. to 460° C.; 430° C. to 450° C.; 430° C. to 440° C.; 440° C. to 500° C.; 440° C. to 490° C.; 440° C. to 480° C.; 440° C. to 470° C.; 440° C. to 460° C.; 440° C. to 450° C.; 450° C. to 500° C.; 450° C. to 490° C.; 450° C. to 480° C.; 450° C. to 470° C.; 450° C. to 460° C.; 460° C. to 500° C.; 460° C. to 490° C.; 460° C. to 480° C.; 460° C. to 470° C.; 470° C. to 500° C.; 470° C. to 490° C.; 470° C. to 480° C.; 480° C. to 500° C.; 480° C. to 490° C.; and 490° C. to 500° C. In other embodiments, the boiling point of the high boiling plasticizer is greater than 400° C. In other embodiments, the boiling point of the high boiling plasticizer is greater than 500° C.

Suitable high boiling plasticizers include, but are not limited to, phthalate and trimellitate esters, for example, dialkyl phthalates and trialkyl trimelliates. The alkyl groups are each independently selected from alkyl groups having from 4 to 20 carbon atoms; 5 to 20 carbon atoms, 6 to 20 carbon atoms; 7 to 20 carbon atoms; 8 to 20 carbon atoms; or 9 to 20 carbon atoms. In other embodiments, the alkyl groups have from 10 to 20 carbon atoms; 10 to 19 carbon atoms; 10 to 18 carbon atoms; 10 to 17 carbon atoms; 10 to 16 carbon atoms; 10 to 15 carbon atoms; 10 to 14 carbon atoms; 10 to 13 carbon atoms; 10 to 12 carbon atoms, 10 to 11 carbon atoms; 11 to 20 carbon atoms; 11 to 19 carbon atoms; 11 to 18 carbon atoms; 11 to 17 carbon atoms; 11 to 16 carbon atoms; 11 to 15 carbon atoms; 11 to 14 carbon atoms; 11 to 13 carbon atoms; 11 to 12 carbon atoms; 12 to 20 carbon atoms; 12 to 19 carbon atoms; 12 to 18 carbon atoms; 12 to 17 carbon atoms; 12 to 16 carbon atoms; 12 to 15 carbon atoms; 12 to 14 carbon atoms; 12 to 13 carbon atoms; 13 to 20 carbon atoms; 13 to 19 carbon atoms; 14 to 18 carbon atoms; 14 to 17 carbon atoms; 14 to 16 carbon atoms; 14 to 15 carbon atoms; 15 to 20 carbon atoms; 15 to 19 carbon atoms; 15 to 18 carbon atoms; 15 to 17 carbon atoms; 15 to 16 carbon atoms; 16 to 20 carbon atoms; 16 to 19 carbon atoms; 16 to 18 carbon atoms; 16 to 17 carbon atoms; 17 to 20 carbon atoms; 17 to 19 carbon atoms; 17 to 18 carbon atoms; 18 to 20 carbon atoms; 18 to 19 carbon atoms; and 19 to 20 carbon atoms.

Other suitable phthalate esters and trimelliate esters include, but are not limited to, diaryl and triaryl esters, respectively. The phthalate esters include, but are not limited to, mixed alkylaryl esters. The trimelliate esters include, but are not limited to, mixed alkylaryl such as the akyldiaryl and dialkylaryl esters. The aryl groups have carbon atom ranges as described above for the alkyl groups. In certain embodiments, the high boiling plasticizer comprises trioctyl trimelliate, diundecyl phthalate or mixtures thereof.

The amount of high boiling plasticizer incorporated into the cellulose ester sufficient to increase the Tg, relative to a similar composition having a TPP plasticizer, is used. In one embodiment, the amount of high boiling plasticizer ranges from about 4 wt percent to about 15 wt percent, based on the total weight of the plasticizer and the cellulose ester. In other embodiments, the amount of high boiling plasticizer ranges from about 4 wt percent to about 15 wt percent; about 4 wt percent to about 14 wt percent; about 4 wt percent to about 13 wt percent; about 4 wt percent to about 12 weight percent; about 4 wt percent to about 11 wt percent; about 4 wt percent to about 10 wt percent; about 4 wt percent to about 9 wt percent; about 4 wt percent to about 8 wt percent; about 4 wt percent to about 7 wt percent; about 4 wt percent to about 6 wt percent; about 4 wt percent to about 5 wt percent; about 5 wt percent to about 15 wt percent; about 5 wt percent to about 14 wt percent; about 5 wt percent to about 13 wt percent; about 5 wt percent to about 12 wt percent; about 5 wt percent to about 11 wt percent; about 5 wt percent to about 10 wt percent; about 5 wt percent to about 10 wt percent; about 5 wt percent to about 9 wt percent; about 5 wt percent to about 8 wt percent; about 5 wt percent to about 7 wt percent; about 5 wt percent to about 6 wt percent; about 6 wt percent to about 15 wt percent; about 6 wt percent to about 14 wt percent, about 6 wt percent to about 13 wt percent; about 6 wt percent to about 12 wt percent; about 6 wt percent to about 11 wt percent; about 6 wt percent to about 11 wt percent; about 6 wt percent to about 10 wt percent; about 6 wt percent to about 9 wt percent; about 6 wt percent to about 8 wt percent; about 6 wt percent to about 7 wt percent; about 7 wt percent to about 15 wt percent; about 7 wt percent to about 14 wt percent; about 7 wt percent to about 13 wt percent; about 7 wt percent to about 12 wt percent; about 7 wt percent to about 11 wt percent; about 7 wt percent to about 10 wt percent; about 7 wt percent to about 9 wt percent; about 7 wt percent to about 8 wt percent; about 8 wt percent to about 15 wt percent; about 8 wt percent to about 14 wt percent; about 8 wt percent to about 13 wt percent; about 8 wt percent to about 12 wt percent; about 8 wt percent to about 11 wt percent; about 8 wt percent to about 10 wt percent; about 8 wt percent to about 9 wt percent; about 9 wt percent to about 15 wt percent; about 9 wt percent to about 14 wt percent; about 9 wt percent to about 13 wt percent; about 9 wt percent to about 12 wt percent; about 9 wt percent to about 11 wt percent; about 9 wt percent to about 10 wt percent; about 10 wt percent to about 15 wt percent; about 10 wt percent to about 14 wt percent; about 10 wt percent to about 13 wt percent; about 10 wt percent to about 12 wt percent; about 10 wt percent to about 11 wt percent; about 11 wt percent to about 15 wt percent; about 11 wt percent to about 15 wt percent; about 11 wt percent to about 14 wt percent; about 11 wt percent to about 13 wt percent; about 11 wt percent to about 12 wt percent; about 12 wt percent to about 15 wt percent; about 12 wt percent to about 14 wt percent; about 12 wt percent to about 13 wt percent; about 13 wt percent to about 15 wt percent; about 13 wt percent to about 14 wt percent; and about 14 wt percent to about 15 wt percent, based on the total weight of the plasticizer present in the cellulose ester.

In other embodiments the weight percent of high boiling plasticizer ranges from about 20 wt percent to about 100 wt percent, based on the total weight of the plasticizer present in the cellulose ester. In other embodiments the high boiling plasticizer ranges from about 20 wt percent to about 90 wt percent; about 20 wt percent to about 80 wt percent; about 20 wt percent to about 70 wt percent; about 20 wt percent to about 60 wt percent; about 20 wt percent to about 50 wt percent; about 20 wt percent to about 40 wt percent; about 20 wt percent to about 30 wt percent; about 30 wt percent to about 100 wt percent; about 30 wt percent to about 90 wt percent; about 30 wt percent to about 80 wt percent; about 30 wt percent to about 70 wt percent; about 30 wt percent to about 60 wt percent; about 30 wt percent to about 50 wt percent; about 30 wt percent to about 40 wt percent; about 40 wt percent to about 100 wt percent; about 40 wt percent to about 90 wt percent; about 40 wt percent to about 80 wt percent; about 40 wt percent to about 70 wt percent; about 40 wt percent to about 60 wt percent; about 40 wt percent to about 50 wt percent; about 50 wt percent to about 100 wt percent; about 50 wt percent to about 90 wt percent; about 50 wt percent to about 80 wt percent; about 50 wt percent to about 70 wt percent; about 50 wt percent to about 60 wt percent; about 60 wt percent to about 100 wt percent; about 60 wt percent to about 90 wt percent; about 60 wt percent to about 80 wt percent; about 60 wt percent to about 70 wt percent; about 70 wt percent to about 100 wt percent; about 70 wt percent to about 90 wt percent; about 70 wt percent to about 80 wt percent; about 80 wt percent to about 100 wt percent; about 80 wt percent to about 90 wt percent; and about 90 wt percent to 100 wt percent, based on the total amount of plasticizer.

In certain embodiments according to the present invention, the high boiling plasticizer comprises at least about 10 wt %, or at least about 25 wt %, or at least about 50 wt %, or at least about 75 wt %, or at least about 95 wt % of the total plasticizer. In one embodiment according to the present invention, the high boiling plasticizer comprises about 100 wt % of the total plasticizer.

Low boiling plasticizers include plasticizers having boiling points, typically below 370° C. or below 350° C. or below 325° C. or below 300° C. or below 275° C. or below 250° C.

In certain embodiments, the composition, film or article, comprising a high boiling plasticizer, has a Tg at least 10° C. greater than a similar composition, film or article having only triphenyl phosphate as the plasticizer. In certain embodiments, the composition, film or article, comprising a high boiling plasticizer, has a Tg at least 15° C. greater than a similar composition, film or article having only triphenyl phosphate as the plasticizer. In certain embodiments, the composition, film or article, comprising a high boiling plasticizer, has a Tg at least 20° C. greater than a similar composition, film or article having only triphenyl phosphate as the plasticizer. In certain embodiments, the composition, film or article, comprising a high boiling plasticizer, has a Tg at least 25° C. greater than a similar composition, film or article having only triphenyl phosphate as the plasticizer.

Films may be made by any method including solvent casting and melt extrusion. In certain embodiments, the films range in thickness from about 30 microns to about 240 microns, from 40 microns to about 120 microns, or from 40 microns to about 100 microns.

In certain embodiments according to the present invention, films comprising a high boiling plasticizer have a decreased break stress compared to a similar film having a low boiling plasticizer, i.e., less than about 370° C. In certain embodiments according to the present invention, the films have a break stress decreased by at least about 5%, or at least about 10%, or at least about 15%

In certain embodiments according to the present invention, films comprising a high boiling plasticizer have a decreased yield stress compared to a similar film having a low boiling plasticizer, i.e., less than about 370° C., substituted for the high boiling plasticizer. In certain embodiments according to the present invention, the films have a yield stress decreased by at least about 5%, or at least about 10%, or at least about 15%

This invention can be further illustrated by the following examples of preferred embodiments thereof, although it will be understood that these examples are included merely for purposes of illustration and are not intended to limit the scope of the invention unless otherwise specifically indicated.

EXAMPLES

General

Eastman Chemical Company Plasticizers were reviewed and TOTM and DUP were selected for evaluation in cellulose triacetate (CTA) due to their high boiling points (TOTM, b.p. 414° C., DUP, b.p. 523° C.). A statistically designed experiment was created to compare TOTM and DUP plasticizers to TPP in 80 micron film made using CTA. Each composition was prepared by adding the CTA to a solvent system composed of 90% dichloromethane and 10% methanol by weight, dispersing the CTA for 30 minutes in the solvent using a paint shaker, and dissolving the CTA by rolling the bottle over a period of 5 hours. The solutions were then used to hand cast 80 micron films. Solvent evaporation was carried out in a hood until the residual solvent level was below 10%, and residual solvent was then further reduced by drying the films for 1 hour at 105° C. Results of the experiments are shown below:

| | Sample | | | | | | |
|---|---|---|---|---|---|---|---|
| | 1 | 2 | 3 | 4 | 5 | 6 | 7 |
| % CA 435-40S | 92.0 | 92.0 | 92.0 | 92.0 | 92.0 | 92.0 | 92.0 |
| % Triphenyl phosphate (TPP) | 8.0 | 4.0 | — | 4.0 | — | — | 2.33 |
| % Trioctyl trimellitate (TOTM) | — | 4.0 | 8.0 | — | — | 4.0 | 2.33 |
| % Diundecyl phthalate (DUP) | — | — | — | 4.0 | 8.0 | 4.0 | 2.33 |
| Tg, ° C. | 172.6 | 185.1 | 196.9 | 185.1 | 195.8 | 195.2 | 188.6 |
| Break Stress, psi | 19,238 | 18,136 | 15,828 | 15,629 | 15,164 | 16,239 | 16,876 |
| Yield Stress, psi | 16,319 | 15,231 | 14,077 | 14,422 | 13,148 | 14,276 | 14,461 |
| Young's Modulus, psi | 7,003 | 6,519 | 6,229 | 6,780 | 6,296 | 6,611 | 6,431 |
| Retardation | | | | | | | |
| Re | 0.343 | 0.436 | 0.493 | 0.256 | −0.081 | −0.092 | −0.065 |
| Rth | −69.361 | −64.856 | −77.164 | −61.551 | −60.921 | −63.638 | −57.166 |
| % Moisture Content, absorption | | | | | | | |
| 30% RH | 0.77 | 0.72 | 0.62 | 0.38 | 0.32 | 0.25 | 0.41 |
| 50% RH | 1.08 | 1.09 | 1.04 | 0.81 | 0.86 | 1.18 | 0.87 |
| 70% RH | 1.33 | 1.41 | 1.37 | 1.21 | 1.22 | 1.47 | 1.19 |
| 90% RH | 2.68 | 2.78 | 2.71 | 2.50 | 2.65 | 2.92 | 2.53 |
| WVTR, g * mil/$m^2$/day | 1498 | 1510 | 1426 | 1512 | 1636 | 1678 | 1680 |
| TGA | | | | | | | |
| Temp. at 90% retention, ° C. | 307.5 | 322.8 | 335.5 | 332.4 | 332.4 | 333.4 | 328.6 |

The data shows that use of TOTM and DUP either alone or in combination with TPP significantly increases Tg of the films when compared to TPP alone. Comparison of break stress values demonstrates that at the same weight percent, TOTM and DUP give lower values than does TPP. This indicates that TOTM and DUP are more efficient plasticizers for CTA than is TPP, and that lower weight percents could be used to achieve the same degree of hardness. Percent moisture absorption data indicates that TOTM and DUP do not absorb more water at a given relative humidity than does TPP. Thermogravimetric analysis (TGA) shows that TOTM and DUP have lower volatility at elevated temperatures than does TPP. Light retardation measurements indicate that using DUP results in planar retardation (Re) closer to zero than seen with TPP, and this is a desirable effect. Use of DUP also makes the thickness retardation (Rth) move closer to zero than does the use of TPP. In some LCD applications, this is also a desirable property.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A composition comprising:

a cellulose ester and 4 wt % to 13 wt % of a high boiling plasticizer having a boiling point greater than 370° C., wherein the composition has a Tg greater than an otherwise identical composition having only triphenyl phosphate as a plasticizer, and wherein the wt % of plasticizer is based on the total weight of the cellulose ester and the plasticizer.

2. The composition according to claim 1, wherein the high boiling plasticizer comprises a trialkyl trimellitate, a dialkyl phthalate or a mixture thereof, wherein the alkyl groups independently comprise 4 to 20 carbon atoms.

3. The composition according to claim 1, wherein the high boiling plasticizer comprises trioctyl trimellitate, diundecyl phthalate or a mixture thereof.

4. The composition according to claim 1, wherein the cellulose ester comprises a cellulose acetate, a cellulose acetate propionate, a cellulose acetate butyrate or a mixture thereof.

5. The composition according to claim 1, wherein the composition has a Tg of at least 10° C. greater than an otherwise identical composition having only triphenyl phosphate as a plasticizer.

6. A method of improving thermal properties of a film, the method comprising blending a cellulose ester with 4 to 13 wt % of a high boiling plasticizer having a boiling point greater than 370° C. to form a plasticized cellulose ester; and optionally blending a low boiling plasticizer with the plasticized cellulose ester, wherein the high boiling plasticizer is in an amount sufficient to raise the Tg of the plasticized cellulose ester by at least about 10° C. in comparison a similar composition having only triphenyl as a phosphate, and wherein the wt % of plasticizer is based on the total weight of the cellulose ester and the plasticizer.

7. The method according to claim 6, wherein the high boiling plasticizer comprises at least about 10 weight % of the total amount of plasticizer in the plasticized cellulose ester.

8. The method according to claim 6, wherein the high boiling plasticizer comprises a trialkyl trimellitate, a dialkyl phthalate or a mixture thereof, wherein the alkyl groups independently comprise 4 to 20 carbon atoms.

9. The method according to claim 6, wherein the high boiling plasticizer comprises trioctyl trimellitate, diundecyl phthalate or a mixture thereof 10. The method according to claim 6, wherein the cellulose ester comprises a cellulose acetate, a cellulose acetate propionate, a cellulose acetate butyrate or a mixture thereof.

11. The method according to claim 6, wherein the composition has a Tg at least 15° C. greater than a similar composition having only triphenyl phosphate as a plasticizer.

12. A film comprising a composition comprising:

a cellulose ester and 4 to 13 wt % of a high boiling plasticizer having a boiling point greater than 370° C., wherein the composition has a Tg greater than an otherwise identical composition having only triphenyl phosphate as a plasticizer, and wherein the wt % of plasticizer is based on the total weight of the cellulose ester and the plasticizer.

13. The film according to claim 12, wherein the high boiling plasticizer comprises a trialkyl trimellitate, a dialkyl phthalate or a mixture thereof, wherein the alkyl groups independently comprise 4 to 20 carbon atoms.

14. The film according to claim 12, wherein the high boiling plasticizer comprises trioctyl trimellitate, diundecyl phthalate or a mixture thereof.

15. The film according to claim 12, wherein the cellulose ester comprises a cellulose acetate, a cellulose acetate propionate, a cellulose acetate butyrate or a mixture thereof.

16. The film according to claim 12, wherein the composition has a Tg at least 15° C. greater than a similar composition having only triphenyl phosphate as a plasticizer.

17. The film according to claim 12, wherein the film has a thickness ranging from about 30 to about 240 microns.

18. A method of making a film, the method comprising:

blending 4 to 13 wt % of a high boiling plasticizer into a cellulose ester to form a blend composition; and solvent casting or melt extruding the blend composition to form a film, wherein the film has an increased Tg compared to an otherwise identical film wherein the composition has a Tg greater than an otherwise identical composition having only triphenyl phosphate as a plasticizer, and wherein the wt % of plasticizer is based on the total weight of the cellulose ester and the plasticizer.

19. The film according to claim 18, wherein the low boiling plasticizer is triphenyl phosphate.

20. The film according to claim 18, wherein the Tg is increased by at least about 5° C.

21. The film according to claim 18, wherein the break stress is decreased by at least about 5%.

22. A method of making a film, the method comprising:

blending 4 to 13 wt % of a high boiling plasticizer into a cellulose ester to form a blend composition; and solvent casting or melt extruding the blend composition to form a film, wherein the film has an increased Tg and a compared to film wherein the composition has a Tg greater than an otherwise identical composition having only triphenyl phosphate as a plasticizer, and wherein the wt % of plasticizer is based on the total weight of the cellulose ester and the plasticizer.

23. The film according to claim 22, wherein the low boiling plasticizer is triphenyl phosphate.

24. The film according to claim 22, wherein the Tg is increased by at least about 5° C.

* * * * *